Jan. 7, 1958 C. P. GRAHAM 2,819,035
HIGH-PRESSURE VALVE ASSEMBLY
Filed May 6, 1955
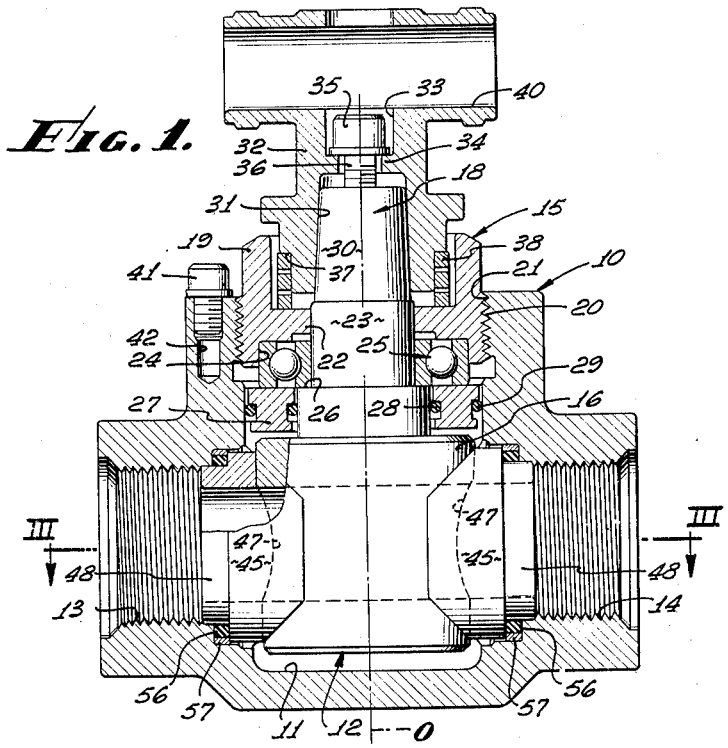
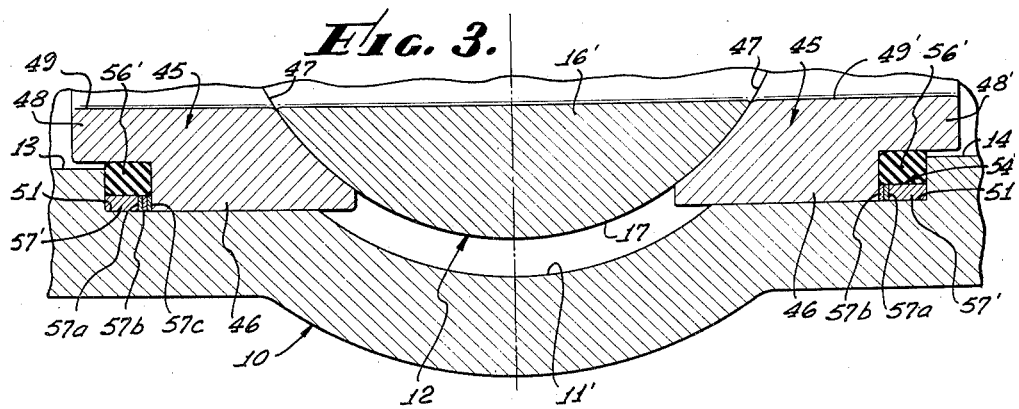
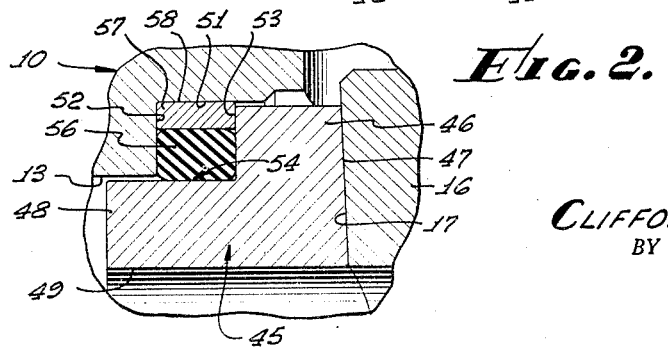
INVENTOR.
CLIFFORD P. GRAHAM
BY
ATTORNEY.

United States Patent Office 2,819,035
Patented Jan. 7, 1958

2,819,035

HIGH-PRESSURE VALVE ASSEMBLY

Clifford P. Graham, North Hollywood, Calif.

Application May 6, 1955, Serial No. 506,545

9 Claims. (Cl. 251—170)

This invention relates to a valve assembly and, more particularly, to a valve assembly for high pressure well fluids, said valve assembly including removable valve seat members and embodying means to position and to seal said seat members with respect to the body member whereby a valve plug member is maintained under precise axial alignment under high pressure conditions.

Prior proposed valve assemblies for high pressure well fluid lines have included removable adjustable valve seat members cooperably engaged with a valve plug member and resiliently seated in the valve body. The construction of such prior proposed valve assemblies permitted relatively great deflection of the axis of the plug member when in closed position, from the normal predetermined axis of rotation of the plug member. Axial misalignment resulted in difficult operation of the valve, especially under high pressure conditions, and excessive wear on bearings in which the plug member was mounted. Such prior proposed valve assemblies provided no safety features in the event of fire. In case of fire the resilient characteristics of the resilient material of the seal rings or springs adjustably seating the seat members were destroyed with the result that proper seating engagement of the seat member against a plug member was lost and the valve was no longer effective in stopping flow of fluid. In prior proposed high pressure valve assemblies wherein the seat members were secured to the valve body difficulty was encountered in precisely machining the valve seat member and the plug member for proper seating engagement. Precise machining was expensive and accurate axial alignment under conditions of high pressure was rarely achieved with the result that the valve was difficult to operate under these pressure conditions.

This invention contemplates the provision of a valve assembly wherein removable valve seat members are utilized on opposite sides of a valve plug member and are limitedly movable between the plug member and the valve body member. The valve seat members in this invention are so positioned and supported in the valve body member that minimum tolerance may be readily and conveniently provided between the valve body member, the valve seat member and the valve plug member. The positioning and support means for such a valve seat member is so constructed and arranged that during assembly the valve plug member may be precisely and accurately axially aligned with respect to a predetermined axis of rotation of the valve plug member. The arrangement of the positioning means is such that under high pressure conditions only minimum deflection of the axis of the plug member is permitted with the result that the valve plug member is at all times smoothly operable between open and closed positions under any condition of pressure in the fluid line in which it is installed.

Generally speaking, this invention contemplates a valve assembly utilizing readily removable valve seat members supported in the valve body for cooperable engagement with a valve plug member. Between each valve seat member and valve body member is provided positioning and sealing means which includes a resilient seal ring initially assembled under preselected deformation so as to urge the valve seat member into desired seating engagement with the valve plug member. In addition to the resilient seal ring a non-yielding positioning means is provided which may comprise a single annular metal ring or a plurality of such rings of selected width so that in assembly minimum clearance may be provided between the non-yielding means, the valve body, and the valve seat member. It is contemplated that such a minimum tolerance may be two-thousandths of an inch and that the number of non-yielding rings associated with each valve seat member may vary so that in assembly the axis of the valve plug member may be precisely aligned with its predetermined axis of rotation. Under conditions of high pressure, the invention contemplates that the valve seat member and the valve body member will each be in tight metal-to-metal contact with the non-yielding means to provide sealing and to positively limit axial misalignment of the valve plug member. Under conditions of low pressure the seal ring of resilient material provides an effective seal against fluid seeking a flow path between the valve seat member and the valve body member. In the event of fire it is readily apparent that destruction of the seal ring of resilient material will not cause or permit substantial opening of the valve and the non-yielding means will afford a substantial seal against leakage.

It is, therefore, among the objects of this invention to disclose and provide a novel valve assembly utilizing removable valve seat members which is smoothly operable under conditions of high pressure.

An object of this invention is to disclose and provide a high pressure valve assembly wherein axial alignment of the valve plug member is maintained during conditions of high pressure.

Another object of this invention is to disclose and provide a novel construction and arrangement wherein inexpensive, simple and economical means are provided to precisely assemble the valve plug member in axial alignment with its axis of rotation.

A further object of this invention is to disclose and provide a valve assembly utilizing removable valve insert members wherein minimum tolerances may be readily and conveniently provided between the valve seat members and the valve body member.

Various other objects and advantages will be readily apparent from the following description of the drawings in which an exemplary embodiment is illustrated.

In the drawings:

Fig. 1 is a sectional view of a valve assembly embodying this invention, the section being taken in a vertical plane bisecting the assembly.

Fig. 2 is an enlarged fragmentary sectional view showing the novel sealing means for the valve seat member and valve body.

Fig. 3 is a fragmentary enlarged sectional view showing a different modification of the sealing means shown in Fig. 2, the section being taken in a horizontal transverse plane indicated by line III—III of Fig. 1.

The exemplary valve assembly shown in the drawings is designed for use in the oil well industry and other industrial installations wherein high fluid pressures are employed for pumping various fluids such as drilling fluids, cement slurries and the like. In general, the valve assembly comprises a valve body 10 provided with a valve chamber 11 within which is positioned a ported valve closure or plug member 12. Plug member 12 is positioned between aligned inlet and outlet ports 13 and 14 provided in the valve body and which may be internally threaded. Ports 13 and 14 afford connection to adjacent pipe sections of a line adapted to carry fluid under pressure. Means generally indicated at 15 are carried by the valve body 10 for rotatably mounting valve plug member 12 for rotation about an axis "O" lying generally perpendicular to the direction of flow of fluid through the valve to regulate flow through the valve chamber 11.

The means 15 may be assembled as a unit for insertion into the valve body and may comprise a frusto-conical ported plug portion 16 on plug member 12 positioned in valve chamber 11 and provided with plug faces 17 for closing said ports 13 and 14. The plug member 12 may include a progressively reduced stepped stem portion 18 integral with plug portion 16. The plug member 12 may be supported by an adjustment nut 19 having a polygonal exterior upper surface and an externally threaded lower section engaging as at 20 a threaded opening 21 in the valve body. The opening 21 is of sufficient diameter for passage therethrough of plug portion 16. The adjustment nut 19 may be provided with an internally ported portion 22 which may receive a reduced stem section 23 of valve stem portion 18. Partition 22 defines a bearing recess 24 within which may be fitted an outer race of a ball bearing means 25. The inner race of said bearing means may be fitted against a shoulder 26 on stem portion 18. A seal between bearing means 25 and valve chamber 11 may be provided by an annular packing plate 27 of generally I-section and inner and outer seal rings 28 and 29 of O-ring type.

Above partition 22, valve stem portion 18 may include a tapered end section 30 received within a corresponding tapered recess 31 formed in a valve actuator member 32. An axial bore 33 in the actuator member extends almost to tapered recess 31 to define an internal flange 34 which affords a seat for head 35 of a preload screw bolt 36 threaded axially in the end of tapered section 30. Access is provided to head 35 of the preload screw bolt through bore 33. The actuator member 32 may be provided with an external downwardly facing shoulder 37 affording a seat for one end of a preload bearing spring 38, the other end of said bearing spring being seated on partition 22. It will be apparent that tightening of preload screw bolt 36 will draw the actuator member 32 and stem portion 18 of the valve closure member towards each other and cause compression of preload bearing spring 38 between shoulder 37 and partition 22.

Actuator member 32 may include a through bore 40 to removably receive a suitable bar or valve operating tool for rotating the valve plug member. Bearing means 25 may be lubricated through a removable inlet plug 41 threaded in the outer end of passageway means 42 which communicates with the bearing recess.

Assembly of valve closure member 12 including bearing means, packing plate, preload spring means and actuator member may be performed prior to assembly of the valve and may be inserted as a unit into the valve body and adjusted by adjustment nut 19. It is understood other means may be employed for rotatably mounting the valve plug member.

A removable valve seat member 45 may be provided for association with each port 13 and 14 and plug portion 16. Each valve seat member includes a cylindrical body portion 46 provided with a plug portion engaging face 47 complementary to plug face 17. Each seat member 45 also includes a reduced cylindrical extension 48 to permit partial projection of said extension 48 into its associated valve port. Each seat member 45 is provided with a port 49 of virtually the same diameter as the port in the plug portion 16.

Encircling each port 13 and 14 is an annular recess 51 within which cylindrical body portion 46 of the associated seat member is slidably fitted. It may be noted that the opening 21 in the valve chamber is somewhat greater than the largest diameter of the plug portion 16 so as to conveniently receive said plug portion and that the length of the cylindrical body portion of the valve seat member is sufficient so that the valve seat member may engage plug portion 16 when portion 46 is partially received within recess 51 and extension 48 within the associated port in the valve body.

Means are provided to position the plug member 12 in precise axial alignment with axis of rotation "O" and to seal each seat member with respect to the valve body 10. These means may include an inwardly directed annular face 52 formed by said recess 51 in valve body 10 and an opposed outwardly directed annular face 53 defined by reduced cylindrical extension 48 and the cylindrical body portion 46. The opposed faces 52 and 53 are spaced apart a selected distance and provide an annular space 54.

Under low pressure conditions axial misalignment of plug member 12 with respect to axis "O" is not critical for smooth operation of the valve. A seal ring 56 sleeved over extension 48 may be interposed between said faces 52 and 53 in space 54. The size and shape of said seal ring 56 is such that in normal position of the valve seat member with respect to the valve body and plug member the seal ring will be under selected compression and deformed to provide sealing engagement against faces 52 and 53. The seal ring 56 may include any suitable torus such as an O-ring made of resilient material such as rubber, synthetic rubber, rubber compositions and the like and capable of resisting deterioration by the type of fluid in the pipe line.

Under conditions of high pressure axial misalignment is critical in its effect on operation of the valve and to provide smooth operation a non-yielding rigid metal ring 57 is provided in each space 54. In this example non-yielding ring 57 may encircle resilient seal ring 56 and is provided with an outer cylindrical surface 58 slidably fitted and received within recess 51. The width of rings 57 is preselected so that minimum tolerance is provided between opposed faces 52, 53 and rings 57 so as to properly position faces 47 on the seat members against plug portion 16 whereby the axis of the plug member is precisely coaxially aligned with axis "O." By precisely machining faces 52 and 53 and the meeting edge faces on the non-yielding ring 57 it will be readily apparent that such a minimum tolerance is conveniently and readily provided. When the term "minimum tolerance" is mentioned, a tolerance in the nature of two-thousandths of an inch is contemplated. The non-yielding ring may be made of any suitable rigid non-yielding metal preferably hardened.

In assembly of the valve described above, it will be readily apparent that each seat member 45 may be provided with resilient seal ring 56 and non-yielding ring 57 by sleeving said rings over cylindrical extension 48. Each seat member with the seal rings thereon may then be inserted through opening 21 of the valve body and positioned with extensions 48 received within the ports 13 and 14. Cylindrical body portion 46 is slidably fitted within recess 51. The unitary assembly 15 may then be inserted through the opening in the valve body and plug member 12 urged between seat members 45. This is readily accomplished because of the tapered construction of plug portion 16. Adjustment nut 19 may then be tightened to finally position plug member 12 in the valve body chamber 11. When plug portion 16 is in proper position, each resilient seal ring 56 will be deformed so as to provide sealing engagement with opposed faces 52 and 53 and at the same time seal rings 56 will serve to bias the valve seat members inwardly into tight engagement with closure faces 17 on plug portion 16. Disassembly of the valve is readily accomplished by reversing the assembly procedure.

It will be readily apparent that the rigid non-yielding ring 57 positively limits axial deflection or misalignment of plug member 12 with respect to its axis of rotation "O" by the amount of minimum tolerance provided between edge faces of ring 57 and the opposed faces 52 and 53. Since this minimum tolerance can be in the nature of two-thousandths of an inch, it will be apparent that when the plug member is in closed position and high pressure is acting thereagainst through the inlet port that displacement of plug portion 16 can only result in movement of two-thousandths of an inch after which metal-to-metal contact is provided between metal seal ring 57 and opposed faces 52 and 53 on the valve body member and seat member respectively. Under high pressure such metal-to-metal contact prevents leakage of fluid between the valve seat member and the valve body member along a path leading through the space 54.

A modification of the positioning and sealing means of this invention is shown in Fig. 3. In this modification a rigid non-yielding ring means 57' may comprise one or more non-yielding resilient rings 57a, 57b, 57c of selected thickness. The provision of one or more of such rings in each space 54 facilitates during assembly precise axial alignment of the axis of the plug member with respect to its axis of rotation "O" since the number of rings on each side of the plug member may vary, only a sufficient number being employed on each side to accurately and precisely position the axis of the plug member. It is also apparent that in this modification a preselected minimum tolerance may be readily provided without difficult machining on faces 52 and 53 of the valve body and seat member respectively. Thus, fabrication of the valve assembly of this invention is considerably reduced in cost without detrimental effects on valve operation.

It will thus be readily apparent to those skilled in the art that each valve seat member is limitedly yieldable under high pressures to a minimum tolerance and that axial deflection of the valve plug member is also extremely limited. As a result operation of the valve assembly of this invention is facilitated so that the valve plug member may be readily and smoothly rotated even when extremely high pressures are present in the pipe lines conducting fluid. In addition the valve assembly of this invention substantially eliminates fire hazard because the valve will remain operable under fire conditions. Even though the resilient seal ring 56 loses its resilient characteristics under high temperatures present during the fire, a substantial seal will be still provided because of the limited tolerance permitted by the rigid non-yielding metal ring 57. Thus, closure of the valve under fire conditions will be substantially effective.

It is understood that various modifications and changes may be made in the valve assembly described above and all such changes and modifications coming within the scope of the appended claims are embraced thereby.

I claim:

1. In a high pressure valve means, the combination of: a valve body provided with an inlet and outlet port for flow of fluid therethrough; a rotatable ported valve member positioned between said ports for regulating flow of said fluid and carried by the valve body for rotation about an axis; a removable ported valve seat member for each of said ports, each seat member having an inner face complementary to the face of the valve member for valve seating engagement therewith; and means positioned between each valve seat member and the valve body for maintaining axial alignment of the plug under high pressure and for sealing each valve seat member with respect to the valve body, said positioning means including means on the valve body and on each seat member defining an annular space therebetween, a seal ring of resilient material in each space for sealing under low pressure and a non-yielding means in said annular space concentric with said resilient seal ring and having edge face engagement with said valve body and said seat member under high pressure.

2. A valve assembly as stated in claim 1 wherein said non-yielding means includes selected annular ring members positioned between said valve body and said seat member for precisely axially aligning said plug member in assembly and during high pressure with minimum tolerance.

3. In a high pressure valve means, the combination of: a valve body provided with oppositely aligned ports for flow of fluid therethrough; a ported valve member mounted for rotation about an axis between said ports to control flow of fluid; a ported valve seat member for each of said ports; means on said valve body and means on each of said valve seat members defining enclosed annular spaces between each seat member and said valve body; and sealing means positioned in each of said annular spaces including a seal ring of resilient material under compression to urge said seat member against said valve member, and a non-yielding rigid ring member limiting relative movement between said valve body and said seat member.

4. In a valve means as stated in claim 3 wherein said rigid ring member has a width virtually the same width as said annular space when said valve member is co-axially aligned with said axis.

5. A valve means as stated in claim 3 wherein each ring member includes a plurality of ring elements of selected width.

6. In a valve means, the combination of: a valve body provided with a port for flow of fluid therethrough; a ported valve member mounted for rotation about an axis to control flow of fluid through said port; a ported valve seat member for said port; means on said valve body and means on said valve seat member defining an enclosed annular space therebetween; and sealing means positioned in said annular space including a resilient seal ring under compression and deformable to urge said seat member against said valve member, and a non-yielding rigid ring member for limiting relative movement between said valve body and said seat member in one direction.

7. In a valve means, the combination of: a valve body provided with a port for flow of fluid therethrough; a ported valve member mounted for rotation about an axis to control flow of fluid through said port; a ported valve seat member for said port; means on said valve body and means on said valve seat member defining an enclosed annular space therebetween; and sealing means positioned in said annular space including a resilient seal ring under compression and deformable to urge said seat member against said valve member, and a non-yielding rigid seal ring means positioning said seat member to limit axial deflection of said valve member from said axis of rotation.

8. A valve means as stated in claim 7 wherein said ring means includes one or more rigid ring elements to precisely position the valve member in axial alignment with said axis of rotation.

9. A valve means as stated in claim 7 wherein said non-yielding ring means encircles said resilient seal means.

References Cited in the file of this patent

UNITED STATES PATENTS

| | | |
|---|---|---|
| 2,396,005 | Gross | Mar. 5, 1946 |
| 2,529,412 | Parker | Nov. 7, 1950 |
| 2,537,249 | Walton | Jan. 9, 1951 |
| 2,628,060 | Parker | Feb. 10, 1953 |
| 2,638,243 | Davies | May 12, 1953 |